Patented Aug. 14, 1923.

1,464,520

UNITED STATES PATENT OFFICE.

LOUIS ANTON VON HORST, OF COBURG, GERMANY.

FLAVORING AGENT FOR BEVERAGES.

No Drawing. Application filed October 6, 1922. Serial No. 592,918.

*To all whom it may concern:*

Be it known that I, LOUIS ANTON VON HORST, residing at 5 Festungsstrasse, Coburg, Bavaria, Germany, have invented certain new and useful Improvements in Flavoring Agents for Beverages, of which the following is a specification.

This invention relates to the flavoring of beverages and more particularly to flavoring agents produced from hops and to a process for enhancing the commercial value and utility of hops. The flavoring agents produced in accordance with the invention are particularly adapted for improving the quality and flavor of beer and of substitutes for coffee produced from corn such as barley.

I am aware that extracts for brewing beer are known which contain separately the important substances of hops. But in the known processes of this kind the quality of the product is considerably impaired by the fact that the soft resins and thus the most valuable components of the hop shells or hop powder treated with water or steam are spoiled or hardened by the action of the water or steam.

In contradistinction to the known processes the hops, after they have been ground and freed of lupuline to the extent that their freshness renders possible, and the lupuline itself, or a part of it, are first treated with ether and alcohol in such a manner that the ether extracts the oil and the principal part of the soft resin. This is followed by a treatment with alcohol for the purpose of extracting the remaining soft resin and also the hard resin. Preferably the soft resin is then separated from the hard resin by treatment with petroleum ether. Only after the most valuable components have all been extracted in this manner, without impairing the quality of the oil and the soft resin, the tanning principle, fats and other components soluble in water, contained in the residues of the treated hops, are washed out with water. The extracts obtained in this manner may now be mixed in various quantities according to the desired color, mildness or strength, flavor, and degree to which a smell of hops is to be produced, and if desired hop oil of different fractions, which has been obtained separately by fractional distillation, may also be added.

The value of the hops is considerably improved by this process and besides a great reduction of the expenses of brewing may be effected.

A more detailed description of the process will now be given: The hops are first ground and then the lupuline is separated by sieves as far as the freshness of the hops will permit. Then the entire lupuline or bitter principle of the hops, or a part of it and the hops freed from lupuline are treated with ether which extracts the oil and most of the soft resin. Thereupon all the other components soluble in alcohol, including the hard resin and the remainder of the soft resin, are extracted with alcohol. Preferably the remainder of the soft resin will then be separated from the hard resin and extracted by means of petroleum ether. It will thus be seen that by this procedure 3 extracts are obtained which can be concentrated separately. The entire residues of the hops which contain the tanning principle, fats and other components soluble in water are treated by water and the extract then concentrated.

The aforementioned first three extracts and the products obtained from the residues of the hops are then mixed as desired for the various kinds of beer and then added to the wort. It will often be found advantageous to add to the different mixtures of the said extracts a mixture of different fractions of the fractionally distilled oil. A mixture of the said different fractions is also added to the wort, beer in the vat, or to the finished beer in order to either impart a special taste of hops to the beer, or to enable old hops to be used for brewing without adding fresh hops and yet to produce a beer which, as has been found by experience, is not inferior to that produced from fresh hops.

The aforementioned extract obtained by water from the residual hops is also a valuable flavoring agent for improving the taste of a substitute for coffee obtained from corn such as rye or barley. This extract, suitably diluted with water, is mixed with the corn either by itself or with an admixture of the first three aforementioned extracts. The corn is soaked with these extracts, or with any desired mixture of them with the extract obtained from the residual hops by water, or with the latter mixture alone, suitably diluted. The corn is then dried and roasted. In this way it is impregnated with the first named three extracts, or only with the extract from the residues of the hops, and a substitute for coffee is thus obtained which has a fine flavor.

I claim:—

1. A flavoring agent including hops free of lupuline, and lupuline derived from hops, both the hops and the lupuline being substantially free from oil and the principal part of the soft resin originally contained in the hops and lupuline.

2. A method of producing a flavoring agent, comprising extracting lupuline from hops, treating both the lupuline and hops with ether to extract therefrom oil and the greater part of the soft resin therein, and combining the hops and lupuline after such treatment.

In testimony whereof I affix my signature in presence of two witnesses.

LOUIS ANTON VON HORST.

Witnesses:
E. HOLTJERMANN,
R. T. AUSPACT.